(12) United States Patent
Kimura et al.

(10) Patent No.: US 12,476,520 B2
(45) Date of Patent: Nov. 18, 2025

(54) ROTARY ELECTRIC MACHINE

(71) Applicant: HONDA MOTOR CO., LTD., Tokyo (JP)

(72) Inventors: Yasunari Kimura, Saitama (JP); Yuta Kurosawa, Saitama (JP); Tsuneo Endo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 266 days.

(21) Appl. No.: 18/123,616

(22) Filed: Mar. 20, 2023

(65) Prior Publication Data

US 2023/0318404 A1 Oct. 5, 2023

(30) Foreign Application Priority Data

Mar. 31, 2022 (JP) .................. 2022-060362

(51) Int. Cl.
*H02K 9/14* (2006.01)
*H02K 5/20* (2006.01)
*H02K 7/08* (2006.01)

(52) U.S. Cl.
CPC ............... *H02K 9/14* (2013.01); *H02K 5/20* (2013.01); *H02K 7/08* (2013.01)

(58) Field of Classification Search
CPC .. H02K 9/14; H02K 1/20; H02K 5/20; H02K 1/32; H02K 7/08; F25D 21/004; F25B 45/00; F25B 41/20; F25B 2313/02742; F25B 2600/2515; F25B 2600/2507
USPC .......................................................... 310/52
See application file for complete search history.

(56) References Cited

U.S. PATENT DOCUMENTS

| | | | | |
|---|---|---|---|---|
| 3,388,559 | A | * | 6/1968 | Johnson ................ F25B 31/008 62/505 |
| 3,751,699 | A | * | 8/1973 | Gleichman ............. F16J 15/40 310/90 |
| 2003/0075996 | A1 | * | 4/2003 | Yoshida ................. H02K 5/207 310/58 |
| 2006/0226717 | A1 | * | 10/2006 | Nagayama .............. H02K 9/06 310/58 |
| 2013/0119795 | A1 | * | 5/2013 | Haga ....................... H02K 9/18 310/59 |
| 2014/0152154 | A1 | | 6/2014 | Kimura et al. |

(Continued)

FOREIGN PATENT DOCUMENTS

| | | | |
|---|---|---|---|
| JP | S49-047804 | A | 5/1974 |
| JP | H1155899 | A * | 2/1999 |
| JP | 2019-050707 | A | 3/2019 |

(Continued)

OTHER PUBLICATIONS

English Translation of JPH1155899A (Year: 1999).*
Aug. 5, 2025, translation of Japanese Office Action issued for related JP Application No. 2022-060362.

*Primary Examiner* — Terrance L Kenerly
*Assistant Examiner* — Theodore L Perkins
(74) *Attorney, Agent, or Firm* — Paratus Law Group, PLLC (57) ABSTRACT

A rotary electric machine includes a rotor, a stator which is disposed at a predetermined interval in a radial direction from an outer circumferential surface of the rotor, a housing which accommodates the rotor and the stator, and an inflow passage through which a gas is supplied to a gap between the rotor and the stator.

8 Claims, 4 Drawing Sheets

(56) References Cited

U.S. PATENT DOCUMENTS

2016/0261171 A1\* 9/2016 Mendes ............... H02K 9/14
2021/0211000 A1\* 7/2021 Velly .................. H02K 1/20

FOREIGN PATENT DOCUMENTS

JP        2019-115154 A     7/2019
WO    WO 2013/001645 A1   1/2013

\* cited by examiner

— COMPRESSED GAS
------- OIL

ROTARY ELECTRIC MACHINE

CROSS-REFERENCE TO RELATED APPLICATIONS

This application is based on and claims priority under 35 USC 119 from Japanese Patent Application No. 2022-060362 filed on Mar. 31, 2022. The entire content of the priority application is incorporated herein by reference.

TECHNICAL FIELD

The present disclosure relates to a rotary electric machine.

BACKGROUND ART

In recent years, researches and development that contribute to an energy efficiency have been carried out to ensure access to convenient, reliable, sustainable and advanced energy for more people.

A rotary electric machine such as a motor or a power generator is required to prevent a decrease in an output in order to improve an energy efficiency. Since the output decreases when a temperature of the rotary electric machine becomes high, it is necessary to provide the rotary electric machine with a cooling mechanism to prevent the decrease in output. For example, JP2019-050707A discloses that an oil is supplied to an inside of a motor case and internal components such as a stator are cooled by the oil so that the temperature of the motor does not become high.

When a gap (so-called "air gap") between a rotor and the stator is large, the output of the rotary electric machine decreases, and therefore, it is preferable that the gap is small in order to prevent the decrease in output. However, if the gap is made small, when the oil enters the gap, friction occurs during rotation of the rotor, resulting in the decrease in output. In addition, it is known that when the gap is made small, a three-dimensional vortex is generated in the gap during rotation of the rotor, and heat is generated.

SUMMARY

The present disclosure provides a rotary electric machine capable of preventing an oil from entering a gap between a rotor and a stator, and of cooling the rotor and the stator.

The present disclosure relates to a rotary electric machine, including:
  a rotor;
  a stator disposed at a predetermined interval in a radial direction from an outer circumferential surface of the rotor;
  a housing configured to accommodate the rotor and the stator; and
  an inflow passage through which a gas is supplied to a gap between the rotor and the stator.

According to the present disclosure, it is possible to prevent an oil from entering the gap between the rotor and the stator, and to cool the rotor and the stator.

BRIEF DESCRIPTION OF DRAWINGS

Exemplary embodiments of the present disclosure will be described in detail based on the following figures, wherein.

DESCRIPTION OF EMBODIMENTS

Hereinafter, embodiments of a rotary electric machine according to the present disclosure will be described with reference to the drawings.

First Embodiment

Figure 1:
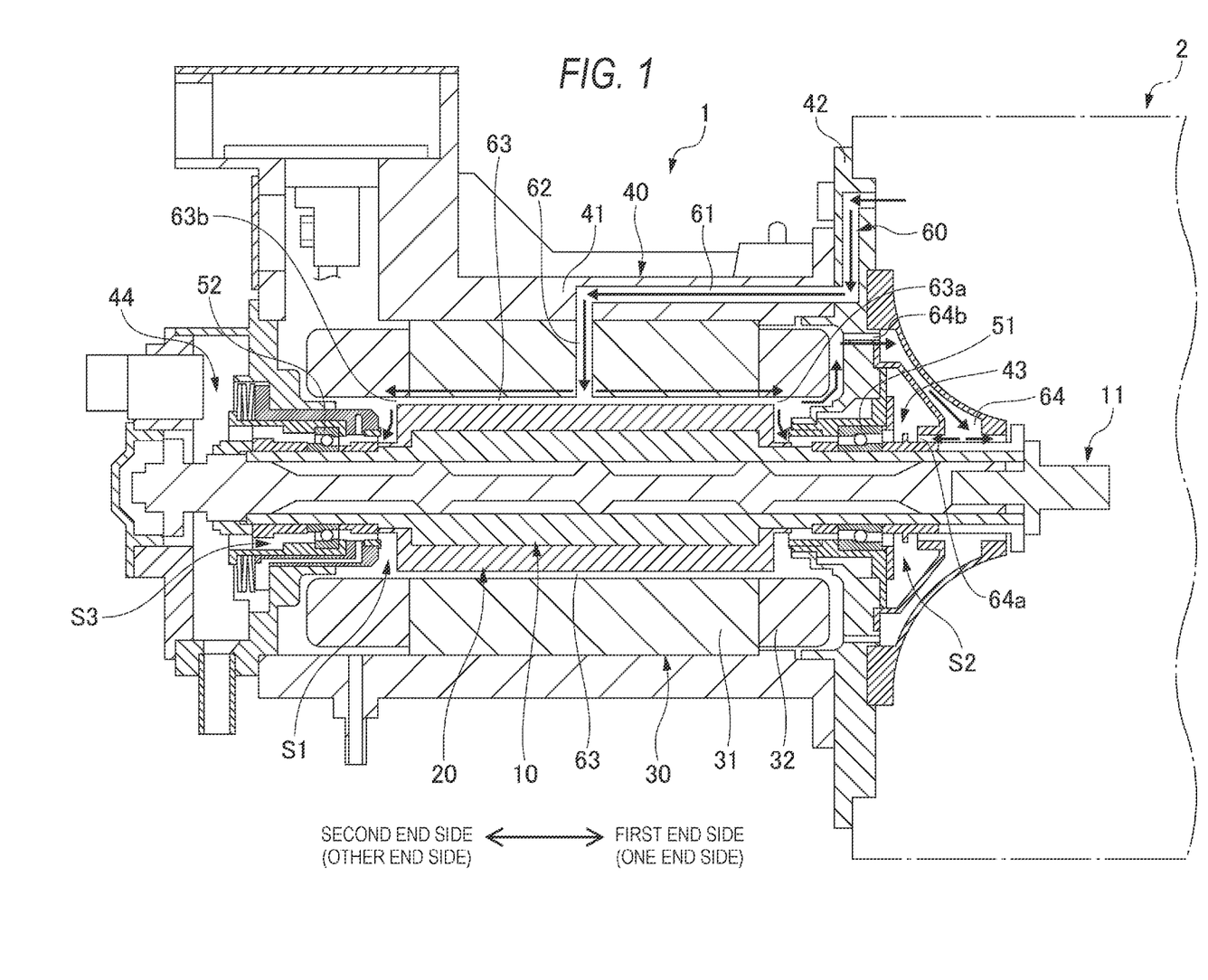
FIG. 1 is a cross-sectional view of a generator 1 according to a first embodiment.

As shown in FIG. 1, a generator 1, which is an example of a rotary electric machine according to the present disclosure, includes a rotor shaft 10, a rotor 20 that rotates integrally with the rotor shaft 10, a stator 30 that is disposed at a predetermined interval in a radial direction from an outer circumferential surface of the rotor 20, a housing 40 that accommodates the rotor 20 and the stator 30, and a pair of bearings 51 and 52 that are disposed respectively on one end side and the other end side in an axial direction with the rotor 20 interposed therebetween and rotatably support the rotor shaft 10 with respect to the housing 40. A permanent magnet (not shown) is attached to the rotor 20, and a coil 32 is wound around a stator core 31 of the stator 30.

A gas turbine engine 2, which is an example of an internal combustion engine, is coupled to the generator 1. Although not shown, the gas turbine engine 2 combusts air compressed by a compressor and fuel (jet fuel or the like) in a combustion chamber, and rotates a turbine by an exhaust flow when a generated high-temperature and high-pressure gas is exhausted. The turbine is coaxially coupled to a turbine coupling portion 11 provided on the rotor shaft 10 of the generator 1, and the rotor shaft 10 rotates by the rotation of the turbine. That is, the generator 1 and the gas turbine engine 2 constitute a power generation system, and the generator 1 generates power by an output of the gas turbine engine 2. Hereinafter, a gas turbine engine 2 side in the axial direction of the generator 1 is also referred to as a first end side, and an opposite side is also referred to as a second end side.

The housing 40 includes a hollow main body portion 41 and a flange portion 42 provided at an end portion of the main body portion 41 on the first end side. The main body portion 41 has a substantially cylindrical shape, and includes an accommodation space S1 that accommodates components such as the rotor 20, the stator 30, and the bearings 51 and 52. The flange portion 42 is fixed to the gas turbine engine 2.

Holes through which the rotor shaft 10 can be inserted are formed in the main body portion 41 and the flange portion 42, and bearing holding portions 43 and 44 are disposed in the hole portions. The bearing holding portions 43 and 44 are provided at end portions of the housing 40 on the first end side and the second end side, and hold the bearings 51 and 52, respectively. That is, the bearing holding portions 43 and 44 support the bearings 51 and 52, which rotatably support the rotor shaft 10, with respect to the housing 40. Further, the bearing holding portions 43 and 44 are provided with an oil flow path through which an oil is supplied to the bearings 51 and 52, an oil jet nozzle and the like (not shown), so that the bearings 51 and 52 are lubricated by the oil.

The generator 1 is provided with a gas inflow passage 60 through which a compressed gas is supplied to the accommodation space S1 of the housing 40. As will be described in detail later, the compressed gas supplied to the accommodation space S1 is effectively used for cooling the rotor 20 and the stator 30. Thick line arrows shown in FIG. 1 indicate a flow of the compressed gas.

The compressed gas is, for example, part of the air compressed by the compressor of the gas turbine engine 2. The gas inflow passage 60 communicates with a compressed gas outflow passage of the gas turbine engine 2, and the compressed gas is supplied to the gas inflow passage 60. The compressed gas is not limited to the gas supplied from the gas turbine engine 2, and may be compressed gas generated by a compressor or the like provided separately from the gas turbine engine 2. Since the air compressed by the compressor has a high temperature, for example, the compressed air is cooled by a heat exchanger (not shown) or the compressed air is cooled by a water jacket (not shown) provided in the housing 40 before being supplied to the gas inflow passage 60.

The gas inflow passage 60 includes a housing-side inflow passage 61 provided in the main body portion 41 and the flange portion 42 of the housing 40, and a stator-side inflow passage 62 provided in the stator 30 and communicating with the housing-side inflow passage 61. The stator-side inflow passage 62 communicates with a gap 63 (so-called air gap) between the rotor 20 and the stator 30, and the compressed gas is supplied to the gap 63.

More specifically, the stator-side inflow passage 62 extends in the radial direction and is connected to a central portion between a first end side end portion 63a and a second end side end portion 63b of the gap 63 provided in the axial direction of the generator 1. The compressed gas supplied to the central portion of the gap 63 in the axial direction flows toward the first end side end portion 63a and the second end side end portion 63b, and is discharged to the accommodation space S1 outside the gap 63. In order to more uniformly supply the compressed gas to the gap 63, a plurality of stator-side inflow passages 62 may be provided in a peripheral direction of the stator 30.

The accommodation space S1 communicates with bearing arrangement spaces S2 and S3 in which the bearings 51 and 52 are arranged (that is, gaps between the bearing holding portions 43 and 44 and the rotor shaft 10). Since the accommodation space S1 into which the compressed gas is introduced has a higher pressure than the bearing arrangement spaces S2 and S3, the compressed gas also flows into the bearing arrangement spaces S2 and S3.

Figure 2:
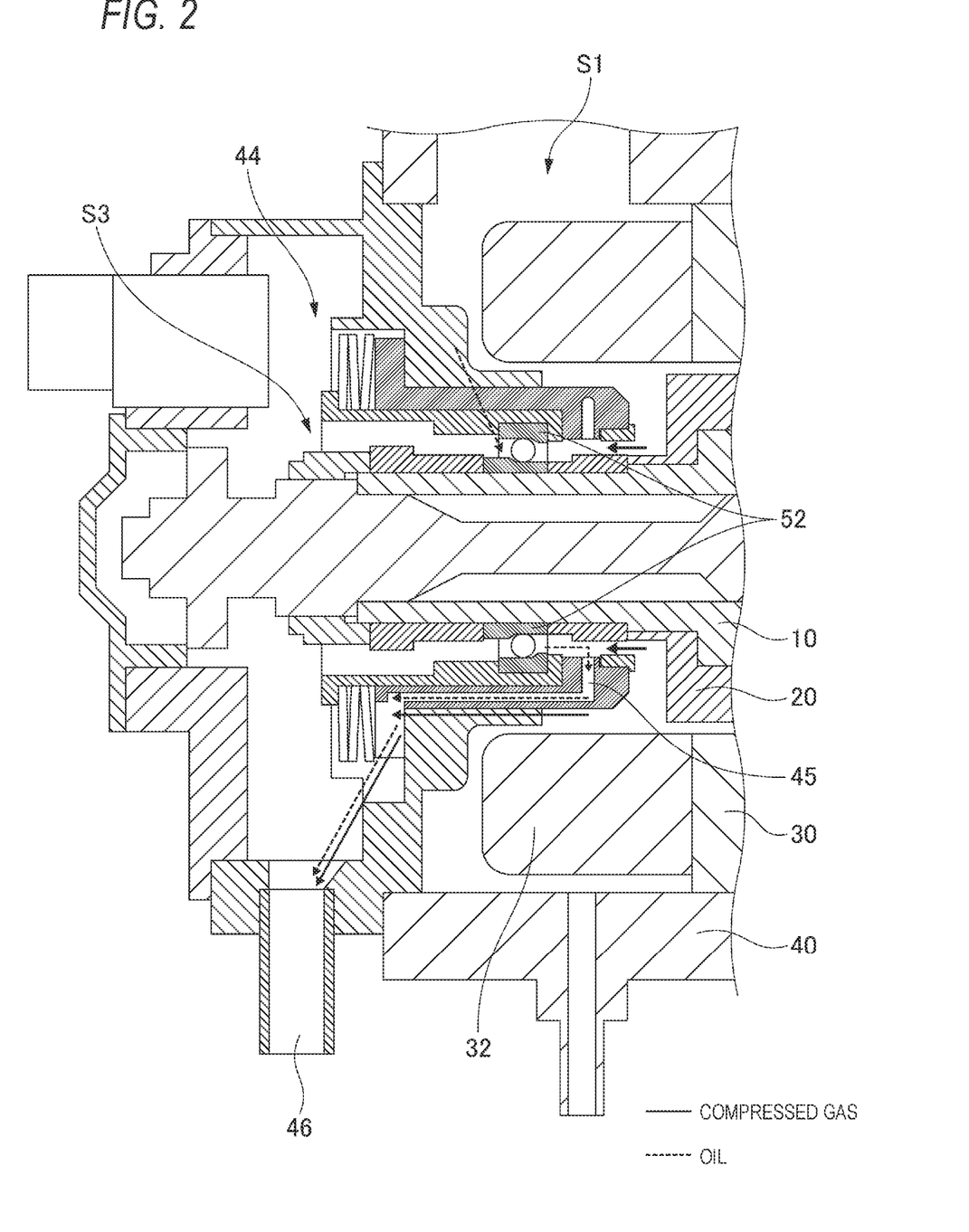
FIG. 2 is an enlarged cross-sectional view of the vicinity of a bearing 52.

FIG. 2 is a partially enlarged view showing the vicinity of the bearing arrangement space S3 in which the bearing 52 is arranged in FIG. 1, in which the flow of the compressed gas is indicated by solid lines and a flow of oil is indicated by broken lines. Note that, when the compressed gas is discharged from the gap 63 to the accommodation space S1, the pressure of the compressed gas may be reduced, but for simplicity, compressed gas discharged to the accommodation space S1 and the bearing arrangement spaces S2 and S3 is also referred to as the compressed gas. Further, since the bearing arrangement space S2 in which the bearing 51 is arranged has the same configuration, the description thereof will be omitted.

As described above, the oil for lubrication is supplied to the bearing 52, and the oil flows in the bearing arrangement space S3. Since the bearing holding portion 44 is provided with an oil discharge path 45 on the first end side (that is, the rotor 20 side) of the bearing 52, the oil flowing through the bearing arrangement space S3 is discharged from the oil discharge path 45 to the outside of the bearing arrangement space S3.

However, a part of the oil flowing through the bearing arrangement space S3 may flow into the accommodation space S1. If the oil flows into the accommodation space S1 and enters the gap 63, friction is generated by the oil in the gap 63 during rotation of the rotor 20, and the output is reduced.

In the present embodiment, since the compressed gas flowing in the accommodation space S1 flows toward the bearing arrangement space S3, the oil supplied to the bearing 52 does not enter the accommodation space S1, and it is possible to prevent the generation of the friction described above. Therefore, the rotor 20 can be rotated under a high load and/or high rotation environment. Further, since the bearing 52 is cooled by the compressed gas, it is possible to reduce damage to the bearing 52 which may become hot due to high speed rotation. The oil flowing through the oil discharge path 45 is discharged to the outside from an oil discharge port 46 together with the compressed gas.

As described above, by supplying the compressed gas to the gap 63 between the rotor 20 and the stator 30, it is possible to prevent the oil supplied to the bearings 51 and 52 from entering the accommodation space S1 outside the bearing arrangement spaces S2 and S3. In addition, since the pressure in the gap 63 is increased by the compressed gas, even if the oil enters the accommodation space S1 and flows toward the first end side end portion 63a and the second end side end portion 63b, it is possible to prevent the oil from entering the gap 63 due to a pressure difference between the inside and the outside of the gap 63. Therefore, when the rotor 20 rotates, it is possible to prevent the decreased in the output due to the friction caused by the oil in the gap 63.

Further, by supplying the compressed gas to the gap 63, it is possible to cool the rotor 20 and the stator 30. In particular, when the gap 63 is minute, a three-dimensional vortex may be generated and heat may be generated during rotation of the rotor 20, but since the compressed gas is supplied to the gap 63 as a refrigerant, it is possible to reduce the heat generated due to the three-dimensional vortex. Therefore, the gap 63 can be made small, and the output of the generator 1 can be improved.

Further, the compressed gas is supplied so as to flow from the central portion of the gap 63 in the axial direction toward the first end side end portion 63a and the second end side end portion 63b. For example, if the compressed gas is supplied from the first end side end portion 63a to the gap 63 and discharged from the second end side end portion 63b, the rotor 20 and the stator 30 can be cooled in the vicinity of the first end side end portion 63a, but the temperature of the compressed gas may gradually increase, and the rotor 20 and the stator 30 may not be cooled in the vicinity of the second end side end portion 63b. In the present embodiment, the compressed gas is supplied from the central portion of the gap 63 in the axial direction, so that the rotor 20 and the stator 30 can be cooled over an entire region in the axial direction.

The compressed gas flowed into the bearing arrangement space S2 in which the bearing 51 is arranged flows through a vent hole 64b formed in the flange portion 42 and a first end side flow path 64 to the turbine coupling portion 11 coupled to the turbine of the gas turbine engine 2. An outflow port 64a of the first end side flow path 64 communicates with the bearing arrangement space S2. With such a configuration, the compressed gas flows toward the bearing arrangement space S2, so that the oil supplied to the bearing 51 can be prevented from flowing to the gas turbine engine 2 via the turbine coupling portion 11. Therefore, it is possible to prevent the decrease in the output of the gas turbine engine 2 due to the friction caused by the oil.

Second Embodiment

Figure 3:
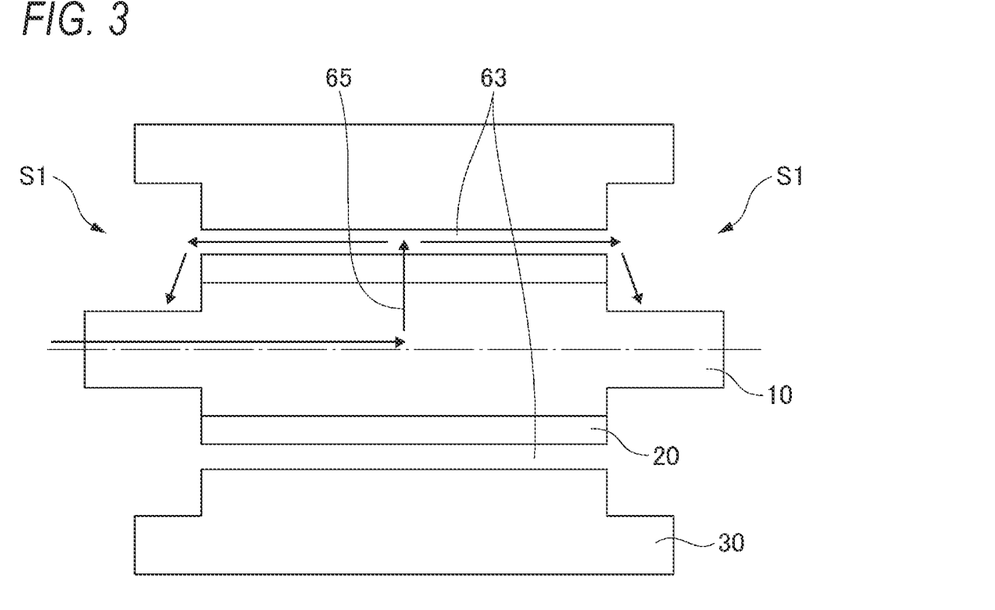
FIG. 3 is a schematic diagram showing a flow of a compressed gas supplied to a gap 63 between a rotor 20 and a stator 30 in the generator 1 according to a second embodiment.

Next, the generator 1 according to a second embodiment will be described with reference to FIG. 3. Members common to those of the first embodiment are denoted by the same reference numerals, and description thereof will be omitted.

In the second embodiment, the gas inflow passage 60 through which the compressed gas is supplied to the accommodation space S1 is provided in the rotor shaft 10 and the rotor 20. Specifically, the gas inflow passage 60 includes, instead of the stator-side inflow passage 62, a rotor-side inflow passage 65 that is provided in the rotor shaft 10 and the rotor 20 and communicates with the gap 63 between the rotor 20 and the stator 30. Although not shown, the rotor-side inflow passage 65 is connected to the housing-side inflow passage 61, and the compressed gas is supplied to the gap 63 through the rotor-side inflow passage 65.

With such a configuration, since the compressed gas can also be supplied to the gap 63, the oil can be prevented from entering the gap 63, and the rotor 20 and the stator 30 can be cooled similarly to the first embodiment.

Third Embodiment

Figure 4:
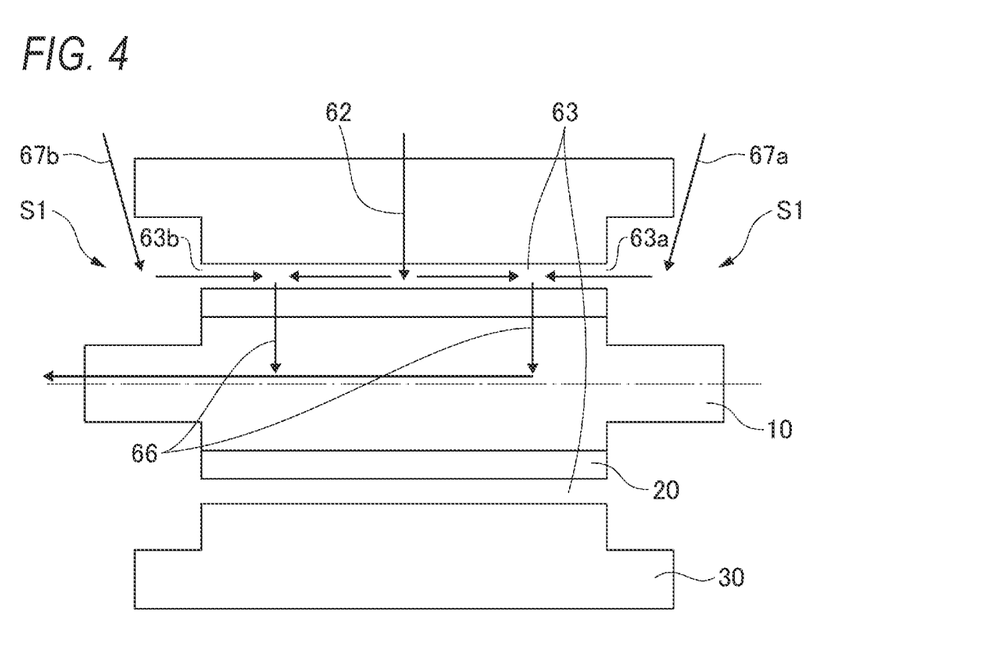
FIG. 4 is a schematic diagram showing a flow of the compressed gas supplied to the gap 63 in the generator 1 according to a third embodiment.

Next, the generator 1 according to a third embodiment will be described with reference to FIG. 4. Members common to those of the embodiments described above are denoted by the same reference numerals, and description thereof will be omitted.

In the third embodiment, the rotor 20 and the rotor shaft 10 are provided with outflow passages 66 through which the compressed gas supplied from the stator-side inflow passage 62 to the gap 63 is discharged to the outside. Specifically, the outflow passages 66 are provided between the first end side end portion 63a and the second end side end portion 63b. With such a configuration, the compressed gas can be discharged to the outside before the compressed gas supplied from the stator-side inflow passage 62 is heated and no longer has a cooling function.

The outflow passages 66 may be provided in the stator 30. In addition, in the example of FIG. 4, two outflow passages 66 communicating with the gap 63 are provided, but the number of the outflow passages 66 is not limited thereto, and may be one or three or more.

In addition to the supply from the stator-side inflow passage 62, the compressed gas may be supplied to the gap 63 from the first end side end portion 63a and the second end side end portion 63b. For example, in the example of FIG. 4, the gas inflow passage 60 includes a first end side inflow passage 67a that is provided in the accommodation space S1 and communicates with the first end side end portion 63a, and a second end side inflow passage 67b that is provided in the accommodation space S1 and communicates with the second end side end portion 63b. At this time, by providing the outflow passages 66 and 66 between the first end side inflow passage 67a and the stator-side inflow passage 62 and between the second end side inflow passage 67b and the stator-side inflow passage 62, respectively, the compressed gas can be discharged to the outside before the compressed gas is heated and no longer has the cooling function.

Fourth Embodiment

Figure 5:
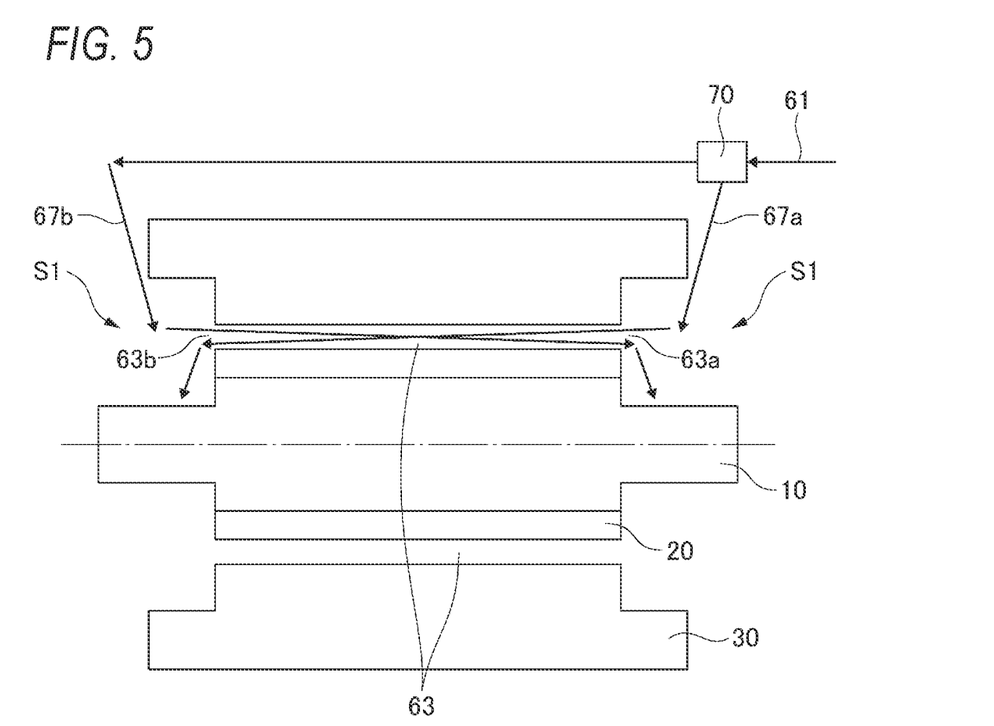
FIG. 5 is a schematic diagram showing a flow of the compressed gas supplied to the gap 63 in the generator 1 according to a fourth embodiment.

Next, the generator 1 according to a fourth embodiment will be described with reference to FIG. 5. Members common to those of the embodiments described above are denoted by the same reference numerals, and description thereof will be omitted.

In the fourth embodiment, the gas inflow passage 60 includes the first end side inflow passage 67a and the second end side inflow passage 67b as in the third embodiment. In the fourth embodiment, the gas inflow passage 60 is not provided in the rotor 20 and the stator 30.

The generator 1 according to the fourth embodiment includes a switching unit 70 capable of alternately switching between supply of the compressed gas from the first end side inflow passage 67a and supply of the compressed gas from the second end side inflow passage 67b. The switching unit 70 includes, for example, a three-way valve capable of switching such that the compressed gas flowing through the housing-side inflow passage 61 flows to the first end side inflow passage 67a or the second end side inflow passage 67b, and the flow passage switching control is executed by a controller or the like.

Specifically, first, the switching unit 70 opens and closes the three-way valve such that the compressed gas flows to the first end side inflow passage 67a, and supplies the compressed gas from the first end side inflow passage 67a to the gap 63. After a predetermined time has elapsed, the switching unit 70 opens and closes the three-way valve such that the compressed gas flows to the second end side inflow passage 67b, and supplies the compressed gas from the second end side inflow passage 67b to the gap 63. The switching unit 70 repeats an operation of alternately switching the flow of the compressed gas in the gap 63 at predetermined time intervals. By such a switching operation, the rotor 20 and the stator 30 can be uniformly cooled in the axial direction.

Although the embodiments of the present disclosure have been described above with reference to the accompanying drawings, it is needless to say that the present invention is not limited to the embodiments. It is apparent that those skilled in the art can conceive of various modifications and alterations within the scope described in the claims, and it is understood that such modifications and alterations naturally fall within the technical scope of the present invention. In addition, the constituent elements in the above embodiments may be freely combined without departing from the gist of the invention.

For example, in each of the above-described embodiments, the generator 1 is coupled to the gas turbine engine 2, but the present invention is not limited thereto. Alternatively, the generator 1 may not be coupled to the gas turbine engine 2.

In each of the above-described embodiments, the generator 1 is exemplified as the rotary electric machine according to the present disclosure, but the present invention is not limited thereto. The rotary electric machine according to the present disclosure may be a motor serving as a drive source.

In each of the above-described embodiments, the compressed gas is supplied, but the present invention is not limited thereto. An uncompressed gas may be supplied as long as the oil can be prevented from entering the gap 63 and the rotor 20 and the stator 30 can be cooled.

In the above-described embodiments, the stator-side inflow passage 62 and the rotor-side inflow passage 65 are connected to the central portion between the first end side end portion 63a and the second end side end portion 63b of the gap 63 in the axial direction. The stator-side inflow passage 62 and the rotor-side inflow passage 65 may not be connected to the central portion. In addition, at least one of the stator-side inflow passage 62 or the rotor-side inflow passage 65 may be provided.

In the present description, at least the following matters are described. It should be noted that the corresponding components and the like in the above-described embodiments are shown in parentheses, but the present invention is not limited thereto.

(1) A rotary electric machine (generator 1), including:
a rotor (rotor 20);
a stator (stator 30) disposed at a predetermined interval in a radial direction from an outer circumferential surface of the rotor;
a housing (housing 40) configured to accommodate the rotor and the stator; and
an inflow passage (gas inflow passage 60) through which a gas is supplied to a gap between the rotor and the stator.

According to (1), since the gas is supplied to the gap between the rotor and the stator, it is possible to prevent an oil from entering the gap. In addition, the rotor and the stator can be cooled.

(2) The rotary electric machine according to (1),
in which the gas supplied to the inflow passage is a compressed gas.

According to (2), since the pressure of the gap between the rotor and the stator is increased by the compressed gas, it is possible to further prevent the oil from entering the gap.

(3) The rotary electric machine according to (1) or (2), further including:
a bearing (bearing 51, 52) configured to support a rotor shaft (rotor shaft 10) of the rotor with respect to the housing,
in which an oil is supplied to the bearing, and
the gas supplied to the gap flows into a space in which the bearing is provided (bearing arrangement space S2, S3).

According to (3), since the gas supplied to the gap between the rotor and the stator flows into the space in which the bearing is provided, it is possible to prevent the oil supplied to the bearing from entering the gap.

(4) The rotary electric machine according to any one of (1) to (3),
in which the inflow passage is provided in the rotor or the stator, and communicates between a one end portion (first end side end portion 63a) and an other end portion (second end side end portion 63b) of the gap in an axial direction.

According to (4), since the inflow passage communicates between the one end portion and the other end portion in the axial direction of the gap between the rotor and the stator, the rotor and the stator can be cooled over the entire region in the axial direction.

(5) The rotary electric machine according to (4),
in which the inflow passage is connected to a central portion between the one end portion and the other end portion of the gap.

According to (5), since the inflow passage is connected to the central portion between the one end portion and the other end portion of the gap between the rotor and the stator, the rotor and the stator can be uniformly cooled on the one end portion side and the other end portion side.

(6) The rotary electric machine according to (4) or (5),
in which the rotor or the stator is provided with at least one outflow passage through which the gas supplied to the gap is discharged to an outside, and
the at least one outflow passage is provided between the one end portion and the other end portion of the gap.

According to (6), since the at least one outflow passage is provided between the one end portion and the other end portion of the gap between the rotor and the stator, it is possible to discharge the compressed gas supplied to the gap to the outside before the compressed gas is heated and no longer has the cooling function. Therefore, the rotor and the stator can be sufficiently cooled.

(7) The rotary electric machine according to any one of (1) to (5),
in which the inflow passage includes at least a first inflow passage (first end side inflow passage 67a, second end side inflow passage 67b) and a second inflow passage (stator-side inflow passage 62) that supply the gas to the gap,
the rotor or the stator is provided with an outflow passage (outflow passage 66) through which the gas supplied to the gap is discharged to an outside, and
the outflow passage is provided between the first inflow passage and the second inflow passage in an axial direction.

According to (7), since the outflow passage is provided between the first inflow passage and the second inflow passage in the axial direction, it is possible to discharge the compressed gas supplied from the first inflow passage and the second inflow passage to the outside before the compressed gas is heated and no longer has the cooling function. Therefore, the rotor and the stator can be sufficiently cooled.

(8) The rotary electric machine according to any one of (1) to (3),
in which the inflow passage includes a one end side inflow passage (first end side inflow passage 67a) communicating with a one end portion of the gap in an axial direction and an other end side inflow passage (second end side inflow passage 67b) communicating with an other end portion of the gap in the axial direction, and
the rotary electric machine further includes a switching unit (switching unit 70) configured to switch between a supply of the gas from the one end side inflow passage and a supply of the gas from the other end side inflow passage.

According to (8), since the switching unit switches between the supply of the gas from the one end side inflow passage and the supply of the gas from the other end side inflow passage, the rotor and the stator can be uniformly cooled in the axial direction.

What is claimed is:

1. A rotary electric machine, comprising:
a rotor;
a stator disposed at a predetermined interval in a radial direction from an outer circumferential surface of the rotor;
a housing configured to accommodate the rotor and the stator;
an inflow passage through which a gas is supplied to a gap between the rotor and the stator; and
a bearing configured to support a rotor shaft of the rotor with respect to the housing,
wherein an oil is supplied to the bearing, the gas supplied to the gap flows into a space in which the bearing is provided, and communication between the space in which the bearing is provided and the gap has two routes.

2. The rotary electric machine according to claim 1, wherein the gas supplied to the inflow passage is a compressed gas.

3. The rotary electric machine according to claim 1, wherein the inflow passage is provided in the rotor or the stator, and communicates between a one end portion and an other end portion of the gap in an axial direction.

4. The rotary electric machine according to claim 3, wherein the inflow passage is connected to a central portion between the one end portion and the other end portion of the gap.

5. The rotary electric machine according to claim 3, wherein the rotor or the stator is provided with at least one outflow passage through which the gas supplied to the gap is discharged to an outside, and the at least one outflow passage is provided between the one end portion and the other end portion of the gap.

6. The rotary electric machine according to claim 1, wherein the inflow passage includes at least a first inflow passage and a second inflow passage that supply the gas to the gap, the rotor or the stator is provided with an outflow passage through which the gas supplied to the gap is discharged to an outside, and the outflow passage is provided between the first inflow passage and the second inflow passage in an axial direction.

7. The rotary electric machine according to claim 1, wherein the inflow passage includes a one end side inflow passage communicating with a one end portion of the gap in an axial direction and an other end side inflow passage communicating with an other end portion of the gap in the axial direction, and the rotary electric machine further comprises a switching unit configured to switch between a supply of the gas from the one end side inflow passage and a supply of the gas from the other end side inflow passage.

8. The rotary electric machine according to claim 1, wherein the gap communicates with the space in which the bearing is provided through an accommodation space which is outside the gap and communicates with the gap and the space in which the bearing is provided.

* * * * *